(12) United States Patent
Kalliske et al.

(10) Patent No.: US 7,963,555 B2
(45) Date of Patent: Jun. 21, 2011

(54) AIRBAG MODULE FOR MOTOR VEHICLE

(75) Inventors: Ingo Kalliske, Potsdam (DE); Christian Schreiber, Ahrensfelde (DE); Michael Hänsel, Bergfelde (DE); Kazuhiro Abe, Chennai (IN)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/656,635

(22) Filed: Feb. 5, 2010

(65) Prior Publication Data

US 2010/0213694 A1 Aug. 26, 2010

Related U.S. Application Data

(63) Continuation of application No. PCT/EP2008/059571, filed on Jul. 22, 2008.

(60) Provisional application No. 61/129,105, filed on Jun. 5, 2008.

(30) Foreign Application Priority Data

Aug. 7, 2007 (DE) .......................... 10 2007 037 604

(51) Int. Cl.
*B60R 21/26* (2011.01)
(52) U.S. Cl. ........ 280/736; 280/731; 280/740; 280/741; 280/742
(58) Field of Classification Search .................. 280/731, 280/732, 736, 738, 740, 741, 742, 743.1
See application file for complete search history.

(56) References Cited

U.S. PATENT DOCUMENTS

| 3,305,319 | A | 2/1967 | Perkins et al. |
|---|---|---|---|
| 3,810,655 | A | 5/1974 | Prachar |
| 5,487,561 | A | 1/1996 | Mandzy et al. |
| 5,624,134 | A | 4/1997 | Iwai et al. |
| 5,669,631 | A | 9/1997 | Johnson et al. |
| 6,076,468 | A | 6/2000 | DiGiacomo et al. |
| 6,095,559 | A * | 8/2000 | Smith et al. ................... 280/741 |
| 6,196,583 | B1 | 3/2001 | Ruckdeschel et al. |
| 6,279,948 | B1 | 8/2001 | Rank |
| 6,299,196 | B1 | 10/2001 | Suzuki et al. |
| 6,409,214 | B2 | 6/2002 | Katsuda et al. |
| 6,412,814 | B1 | 7/2002 | Huber et al. |
| 6,419,262 | B1 | 7/2002 | Fendt et al. |
| 6,854,395 | B2 | 2/2005 | Katsuda et al. |
| 6,886,856 | B2 | 5/2005 | Canterberry et al. |
| 7,690,680 | B2 * | 4/2010 | Meissner et al. .............. 280/736 |

(Continued)

FOREIGN PATENT DOCUMENTS

DE 196 02 695 A1 7/1997

(Continued)

*Primary Examiner* — Toan C To
(74) *Attorney, Agent, or Firm* — Foley & Lardner LLP

(57) ABSTRACT

An airbag module for a motor vehicle is provided. The airbag module comprising a first subassembly which may be arranged on a motor vehicle, an airbag of the first subassembly which may be inflated for protecting a person, which comprises an interior which may be filled with gas for inflating the airbag, a housing of the first subassembly, for receiving the airbag, a gas generator of the first subassembly for inflating the airbag with gas, an additional second subassembly and a reservoir of the second subassembly (for storing a coolant which is designed and provided for cooling gases located in the interior of the airbag. The additional second subassembly is separate from the first subassembly and is designed and provided to be arranged at a distance from the first subassembly on the motor vehicle.

15 Claims, 4 Drawing Sheets

U.S. PATENT DOCUMENTS

| | | |
|---|---|---|
| 2002/0074781 A1 | 6/2002 | Schutz et al. |
| 2006/0005734 A1* | 1/2006 | McCormick .................. 102/530 |
| 2007/0029762 A1* | 2/2007 | Katsuda et al. ............ 280/728.2 |
| 2008/0258438 A1 | 10/2008 | Meissner et al. |
| 2009/0066067 A1 | 3/2009 | Meissner et al. |
| 2010/0148481 A1* | 6/2010 | Meissner et al. .............. 280/736 |
| 2010/0201110 A1* | 8/2010 | Meissner et al. .............. 280/741 |

FOREIGN PATENT DOCUMENTS

| | | |
|---|---|---|
| DE | 196 12 581 A1 | 10/1997 |
| DE | 196 29 541 A1 | 1/1998 |
| DE | 197 26 276 A1 | 12/1998 |
| DE | 199 11 930 A1 | 9/1999 |
| DE | 199 13 145 A1 | 2/2000 |
| DE | 198 46 641 A1 | 4/2000 |
| DE | 198 49 027 A1 | 4/2000 |
| DE | 199 32 696 C1 | 9/2000 |
| DE | 695 15 161 T2 | 9/2000 |
| DE | 200 16 471 U1 | 3/2001 |
| DE | 200 21 532 U1 | 5/2001 |
| DE | 103 61 887 A1 | 7/2005 |
| DE | 20 2005 016 457 U1 | 2/2006 |
| DE | 10 2006 010 953 A1 | 9/2007 |
| EP | 0 978 424 A2 | 2/2000 |
| EP | 0 995 643 A2 | 4/2000 |
| FR | 2 902 060 | 12/2007 |
| WO | WO 2005/058654 A1 | 6/2005 |
| WO | WO 2007/101644 A1 | 9/2007 |
| WO | WO 2007/141335 A1 | 12/2007 |

* cited by examiner

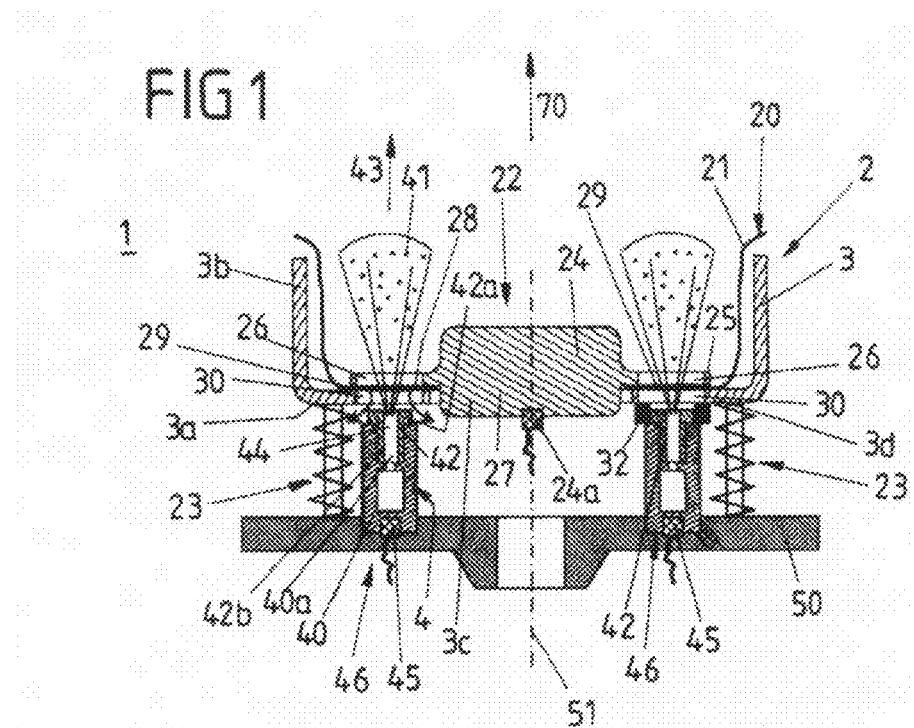
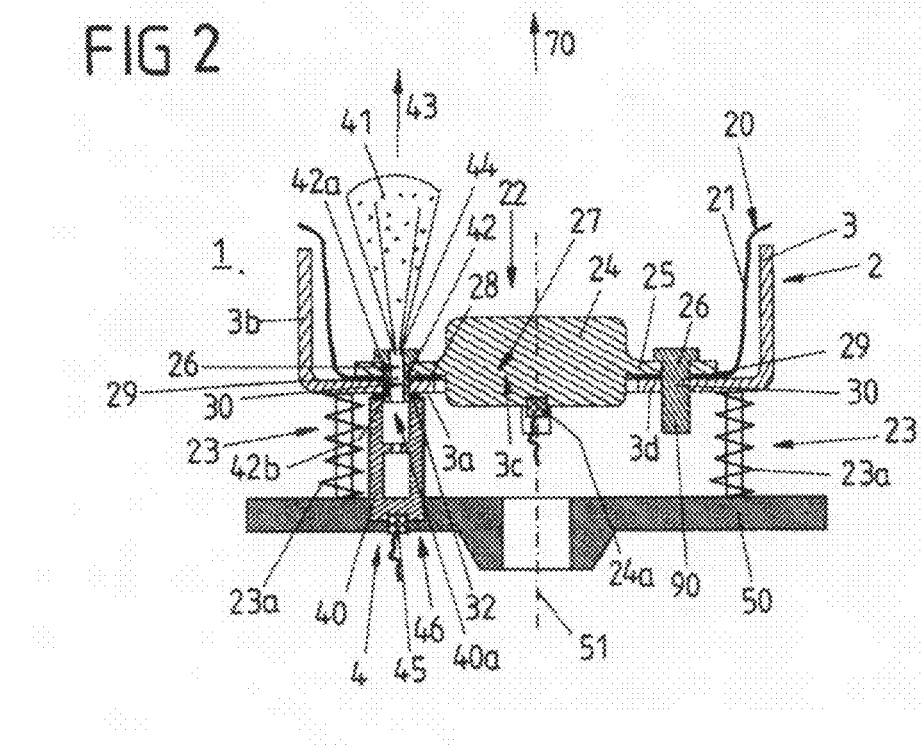

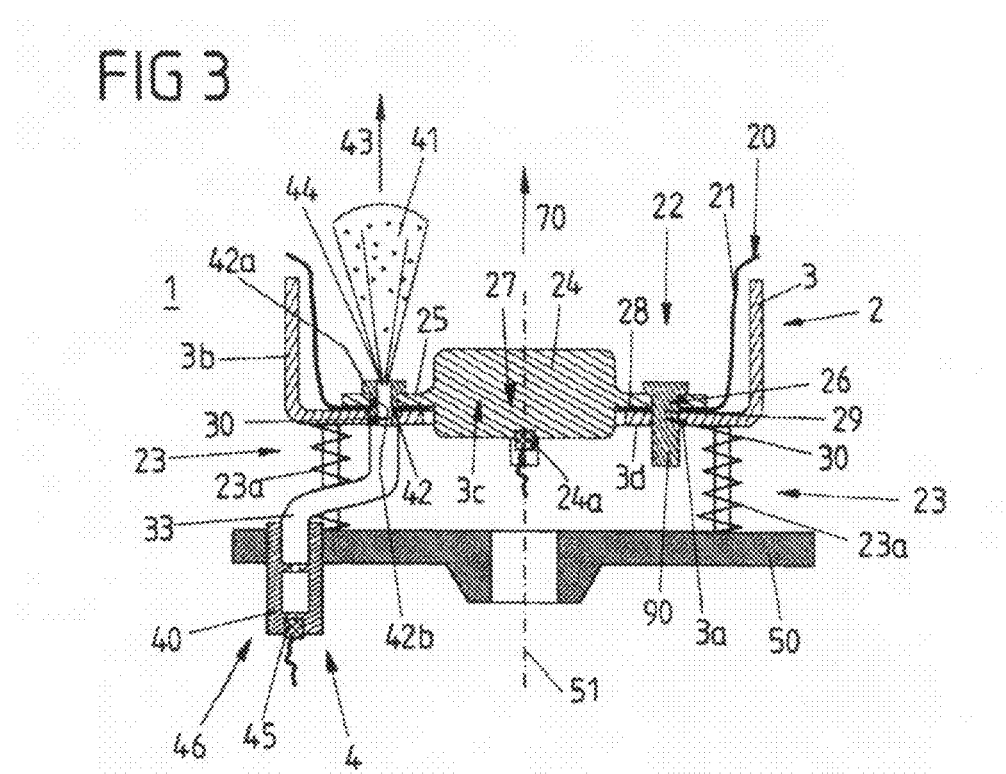
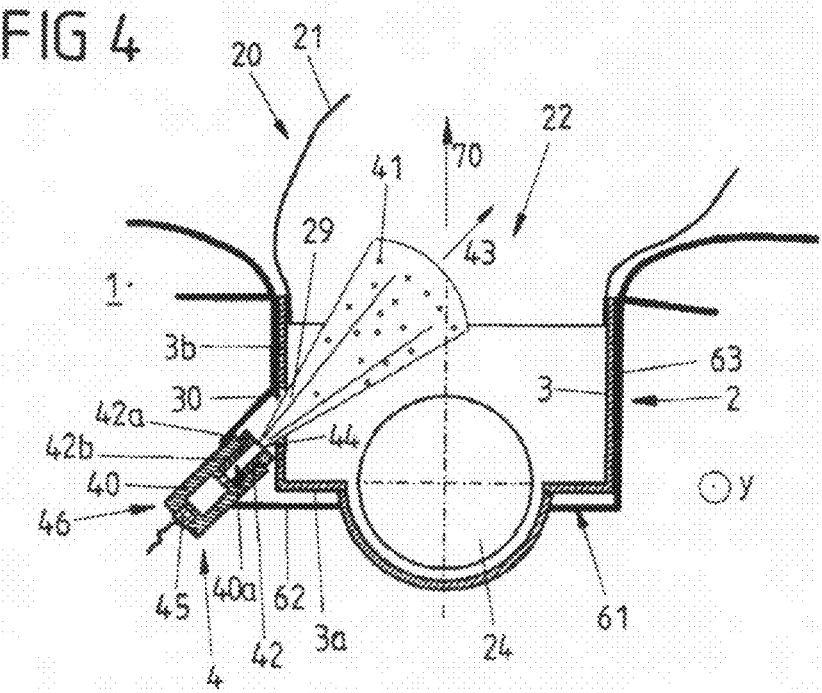

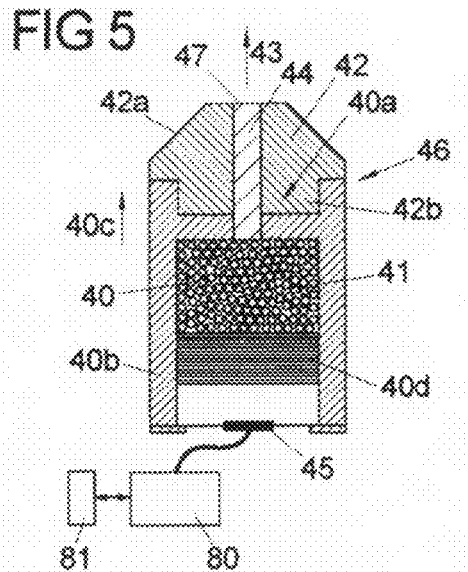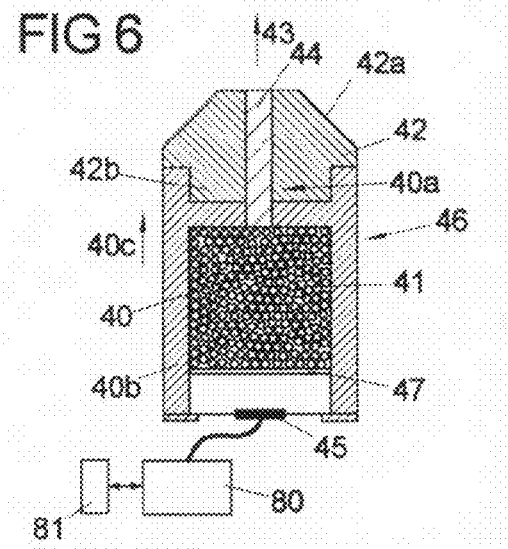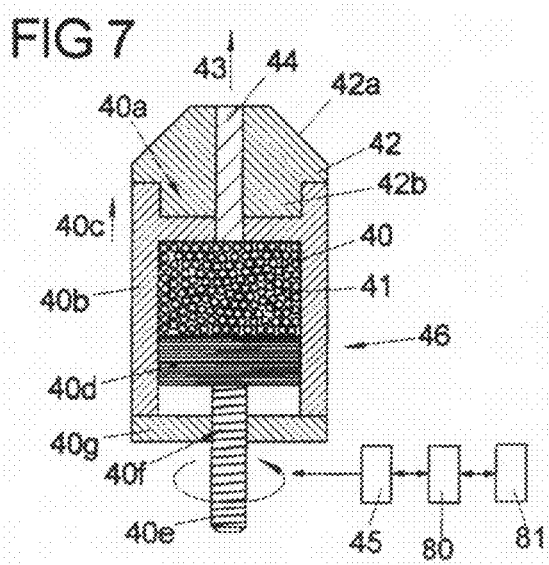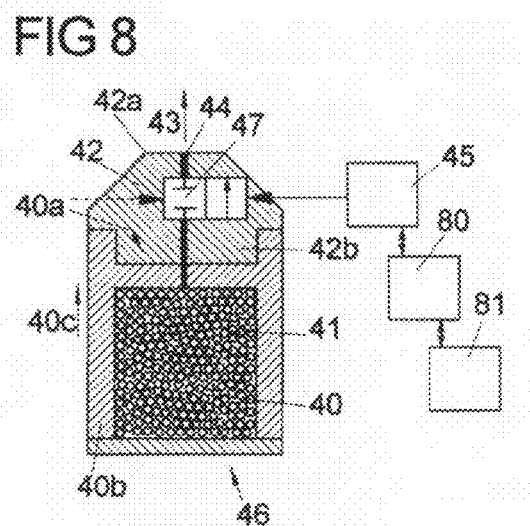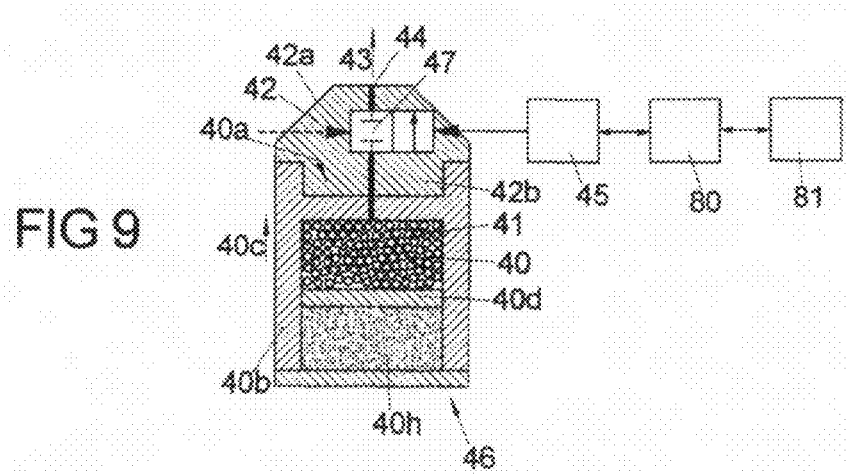

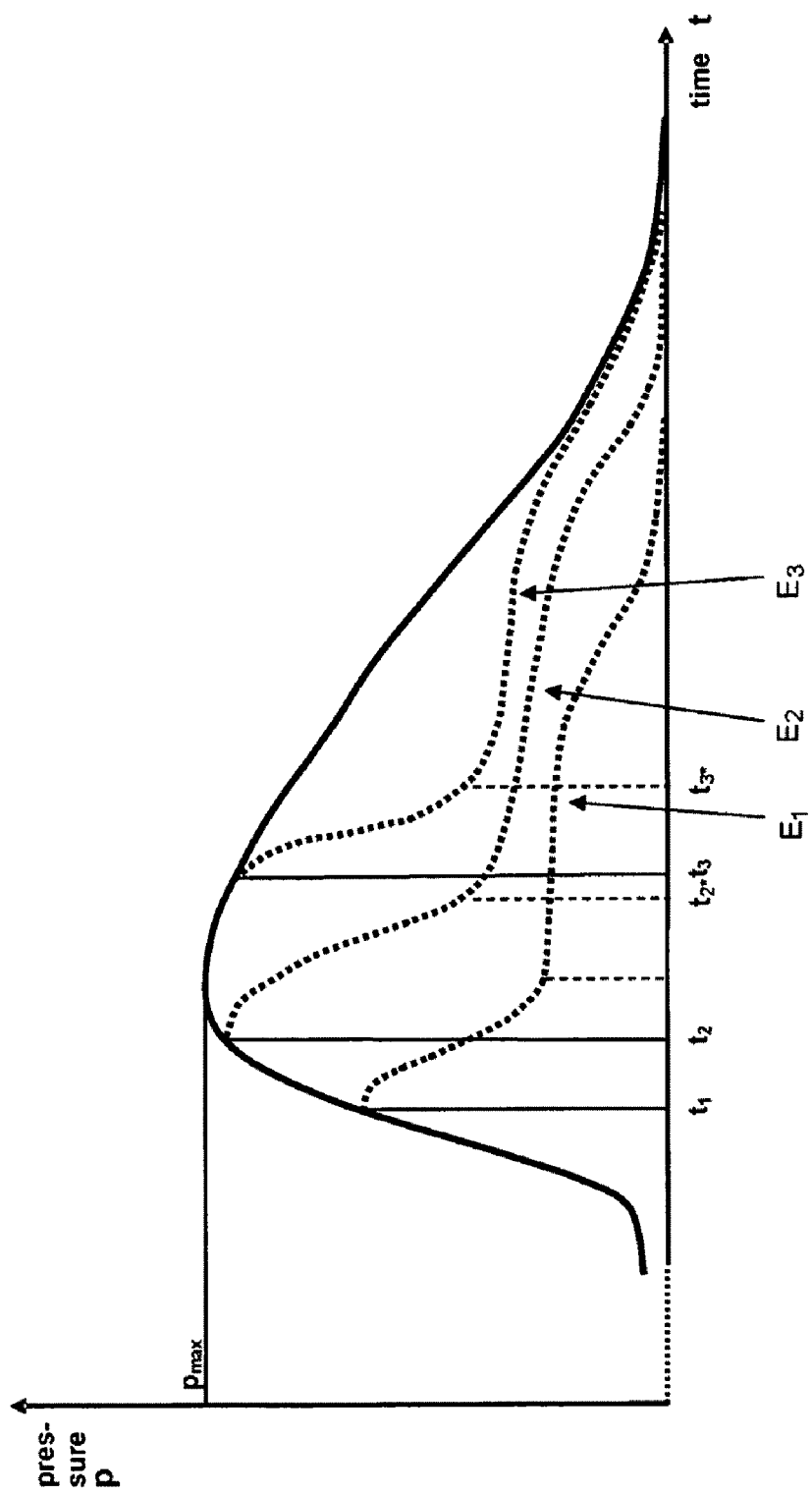

AIRBAG MODULE FOR MOTOR VEHICLE

CROSS-REFERENCE TO RELATED PATENT APPLICATIONS

This application is a Continuation of International Application No. PCT/EP2008/059571, filed Jul. 22, 2008, which was published in German on Feb. 12, 2009 as WO 2009/019130 A1. The foregoing International Application is incorporated herein by reference in its entirety.

BACKGROUND

The invention relates to an airbag module for a motor vehicle.

Such an airbag module comprises an airbag which may be inflated to protect a person which defines an interior of the airbag, which may be filled with gas to inflate the airbag, a housing for receiving the folded airbag and a reservoir for storing a coolant for cooling gases located in the interior of the airbag.

SUMMARY

The object of the invention is to improve an airbag module of the aforementioned type.

The airbag module according to an exemplary embodiment of the invention comprises a first subassembly which may be fastened to a motor vehicle, an airbag of the first subassembly which may be inflated for protecting a person, which defines an interior of the airbag which may be filled with gas for inflating the airbag, and a housing of the first subassembly for receiving the airbag before inflation, as well as an additional, separate second subassembly which is designed and provided to be arranged at a distance from the first subassembly on the motor vehicle and which comprises at least one reservoir of a cooling device for storing a coolant, the coolant being designed and provided for cooling gases located in the interior of the airbag.

Thus the airbag module according to the exemplary embodiment of the invention is on the one hand advantageously of small construction, as the reservoir may be transferred into regions of the motor vehicle which provide sufficient constructional space. Moreover, there is the possibility of separately handling the reservoir and/or the cooling device which results in simplified assembly.

For delivering the coolant into the interior of the airbag, on the reservoir a nozzle is provided which is connected to the reservoir so as to convey coolant, which also may be configured integrally with the reservoir.

So that the coolant may be introduced into the housing and/or the interior of the airbag, the housing comprises at least one through-opening connected to the interior of the airbag so as to convey coolant.

In one exemplary embodiment of the invention it is provided that the nozzle is arranged outside the through-opening in an outer chamber surrounding the housing, i.e. opposes the through-opening in a discharge direction, along which the coolant may be delivered through the nozzle, so that the coolant may pass in the discharge direction through the through-opening into the interior of the airbag. Exemplary, the airbag is secured to the housing such that a through-opening of the airbag comes to rest on the through-opening of the housing. The coolant may thus be introduced through the through-openings of the housing and the airbag directly into the interior of the airbag.

The nozzle may nevertheless also project in the discharge direction at least partially into the through-opening or even project into the interior of the airbag and/or the housing through the through-openings of the housing and the airbag. It is important in the embodiment discussed above, that the nozzle is arranged at a distance from the housing, i.e. has no contact with the housing and/or forms no fixed connection with the housing.

The nozzle is thus, in the embodiment discussed above, associated with the second subassembly and forms with the reservoir and possibly further components provided on the reservoir a second subassembly configured separately from the first subassembly in the form of a cooling device, the nozzle thereof (and/or the discharge opening of the nozzle configured thereon) being arranged at a distance from the first subassembly (relative to a state of the two subassemblies arranged according to requirements in the motor vehicle).

As the nozzle is arranged at a distance from the through-opening of the housing and/or from the housing and thus does not sealingly close the through-opening of the housing, said through-opening is exemplary also designed and provided as a discharge opening, through which gases located in the interior of the airbag may flow into an outer chamber surrounding the housing in order to influence the energy absorption of the airbag.

In an alternative embodiment it is provided that the nozzle is connected to the through-opening, in particular is screwed therein and/or positively and/or non-positively secured in the through-opening. In this case, the nozzle forms a part of the first subassembly and is only connected to the reservoir when assembling the first subassembly on the motor vehicle.

In principle, the reservoir may be connected to the housing via a sealing element, and/or supported on the housing via such a sealing element which is exemplary an O-ring. In this case, the sealing element encompasses the nozzle, preferably in cross section. The sealing element thus produces a sealed connection between the first and second subassembly. This sealing may naturally also be carried out such that the nozzle is further arranged at a distance from the housing and is therefore also suitable for producing a connection between the reservoir and housing with a nozzle associated with the second subassembly.

In a further exemplary embodiment of the invention, the reservoir is connected to the nozzle by means of a line, in particular in the form of a flexible hose pipe, so as to convey coolant. As a result, the reservoir may also be arranged at a greater distance from the first subassembly. Also in this embodiment, the nozzle exemplary forms a part of the first subassembly and is thus exemplary already secured to the housing before the arrangement of the first subassembly relative to the motor vehicle in accordance with requirements and as described above. In other words, the positioning of the nozzle relative to the reservoir takes place when arranging the first subassembly on the motor vehicle. In the event that the nozzle is part of the second subassembly, the nozzle is secured from the start relative to the reservoir, but during the assembly the nozzle is positioned relative to the through-opening of the housing of the first subassembly.

In one exemplary embodiment, the airbag module is designed and provided for fastening to one part of a steering wheel, which is in particular a hub of the steering wheel or a retaining element provided on the hub. For fastening the first subassembly to said part of the steering wheel, the first subassembly has at least one fastening means which exemplary is configured as at least one latching hook which is designed and provided to engage behind a region of the said part to fasten the first subassembly of the airbag module to said part of the steering wheel. To this end, the latching hook may, for example, engage in a recess of said part of the steering wheel.

In the event of a nozzle associated with the first subassembly, said fastening means cooperates with said part of the steering wheel such that—relative to a state of the second subassembly fastened on the steering wheel according to requirements—when fastening the first subassembly to said part of the steering wheel a connection is produced between the nozzle and the reservoir of the second subassembly so as to convey coolant.

In the event of a nozzle associated with the second subassembly, the fastening means cooperates with said part of the steering wheel such that—relative to a state of the second subassembly arranged on the motor vehicle according to requirements—when fastening the first subassembly to that part of the steering wheel the nozzle is positioned relative to the through-opening such that the nozzle may deliver the coolant in the discharge direction into the interior of the airbag.

Exemplary, with an airbag module to be arranged on the steering wheel, the second subassembly is also designed and provided for arranging on said part of the steering wheel which may, in particular, be a hub of the steering wheel.

With subassemblies secured to the hub, the second subassembly, in its state fastened to the hub according to requirements, is exemplary arranged along the steering axis at least partially between the hub and the first subassembly. In this case, exemplary the discharge direction of the nozzle is oriented parallel to the steering axis and/or parallel to a main deployment direction of the airbag, along which the airbag during inflation moves toward an occupant to be protected.

For inflating the airbag, a gas generator associated with the first subassembly is provided which is exemplary arranged in the housing and exemplary comprises a flange for fastening to said housing.

Exemplary this flange is also used for securing the airbag in the housing, by an edge region of the airbag defining an inlet opening being clamped between the flange and the housing. In this case, the gas generator exemplary projects along the steering axis or in the main deployment direction through the inlet opening into the interior of the airbag.

In an exemplary variant of the invention, the flange has a through-opening which is connected via a through-opening of the edge region of the airbag clamped between the flange and the housing to the through-opening of the housing, the three through-openings exemplary being located above one another in a congruent manner.

Exemplary, in the event that the nozzle is part of the first subassembly, the nozzle penetrates the three through-openings of the housing, the edge region and/or the flange, and in this case is also used exemplary for securing the flange of the gas generator to the housing. Naturally, in the event that it is part of the second subassembly, the nozzle may also penetrate through the three through-openings, the nozzle however not being secured in the opening and/or having no contact with the first subassembly.

In a further exemplary embodiment of the invention, the first subassembly is designed and provided for arranging on a dashboard of a motor vehicle and namely in particular for arranging in a receiver of a retaining element provided on the dashboard, which provides a wall at least partially encompassing the first subassembly. Exemplary, the second subassembly comprising the nozzle is provided for arranging on said wall such that, with a first subassembly arranged according to requirements in said receiver, the nozzle opposes the through-opening of the housing in the discharge direction. In this case, the reservoir is exemplary arranged at an angle to the main deployment direction of the airbag, so that the discharge direction of the nozzle extends at an angle to the main deployment direction. In other words, the reservoir is arranged transversely to the main deployment direction, offset to the housing and namely preferably to the side of the housing. This has the advantage that the depth of the receiver (constructional space for the first subassembly) may be smaller in the main deployment direction.

For discharging the coolant, exemplary a device for generating movement associated with the second subassembly is provided on the reservoir which is designed and provided to subject the reservoir to a pressure for delivering the coolant into the interior of the airbag. The device for generating movement may, for example, provide the pressure pyrotechnically or mechanically, for example by driving a piston by means of a motor. Naturally, there is also the possibility that the reservoir and/or the coolant is pressurized from the start. In this case, a device for generating movement may be provided for regulating the nozzle.

Exemplary, the device for generating movement is coupled to an electronic control unit which triggers the device for generating movement for subjecting the reservoir to a pressure depending on at least one parameter which may be detected by a sensor unit at a predeterminable time. In this case, the electronic control unit is exemplary configured to calculate said time, depending on at least one parameter which may be detected by the sensor unit.

This parameter may, for example, be the mass of the occupant to be protected by the airbag, a deceleration of the motor vehicle as a result of an accident, a relative speed between the motor vehicle and a collision object colliding with the motor vehicle, or a distance between the airbag and an occupant in the main deployment direction of the airbag (i.e. the spatial position of the occupant in the motor vehicle). It is naturally also possible that the electronic control unit evaluates a selection of the above parameters to determine a time for activating the cooling device.

By means of the disclosed cooling device, which is made up at least of the nozzle, the reservoir, the coolant located therein and the device for generating movement for delivering the coolant, advantageously the temperature of the gas located in the airbag may be influenced irrespective of the time for activating the gas generator. As the gas pressure prevailing in the airbag increases with the temperature of the gas located in the airbag, the pressure may be adapted to a person to be protected and/or a specific accident situation by cooling of the gases located in the airbag. Thus, for example, in a minor accident or with a lightweight person, such as for example a 5% female, the cooling of the gas used for inflating the airbag may take place relatively early, so that the airbag is inflated to a lesser degree, whilst in a particularly serious accident or with a very heavy person (50% male and 95% male) cooling of the gas may take place correspondingly late or possibly not at all, so that the airbag is correspondingly rigidly inflated.

Moreover, for example with an OOP-situation (out of position), i.e. an occupant to be protected by the airbag is not positioned far enough from the airbag, in a main deployment direction in which the airbag moves when deployed toward the occupant, the cooling of the gas located in the airbag may be initiated prematurely, so that the airbag has a lower gas pressure corresponding to the short distance between the occupant and the airbag, in order not to injure the occupant when deployed.

A further inventive idea is to provide an airbag module arrangement with an airbag module according to the invention and a motor vehicle part, to which the assemblies of the airbag modules may be secured. Such a motor vehicle part, for example, is a steering wheel, in particular the hub of a steering wheel. With an airbag module in the form of a passenger airbag module, said motor vehicle part is exemplary a dashboard, on said dashboard a retaining element being provided, possibly configured integrally with the dashboard, and which exemplary forms a receiver for the first subassembly with a wall at least partially encompassing the first subassembly, to which the second subassembly is secured as described above.

The cooling device described in the present case, in particular in connection with a driver airbag module and/or passenger airbag module, may naturally be used with any type of airbag module which comprises an airbag, which is filled with (hot) gases, in particular also with airbag modules which are provided for protecting people, which are located elsewhere on the motor vehicle.

The cooling device is in the present case designed and provided for cooling gases located in an airbag. To this end, the coolant may be delivered, in particular, upon inflation, i.e. during inflation (in particular toward the end of the inflation) as well as after inflation, i.e. after the gas generator has ejected (substantially) all gas, and namely preferably into the interior of the airbag. The inflation of the airbag is initiated by activating (igniting) the gas generator.

BRIEF DESCRIPTION OF THE DRAWINGS

The features and advantages of the invention shown are to be clarified with reference to the following description of the figures of embodiments.

FIG. 1 shows a schematic sectional view of an airbag module, with a cooling device arranged separately from a housing of the airbag module, with a nozzle, the discharge opening thereof being arranged outside the housing and with an optional seal for producing a sealed connection between a reservoir of the cooling device and the housing of the airbag module.

FIG. 2 shows a schematic sectional view of a modification of the airbag module shown in FIG. 1, in contrast to FIG. 1 the nozzle being secured to the housing, so that the discharge opening is arranged inside the housing.

FIG. 3 shows a schematic sectional view of a modification of the airbag module shown in FIG. 2 in which the nozzle is connected by means of a hose pipe to the reservoir.

FIG. 4 shows a schematic sectional view of a modification of the airbag module shown in FIG. 1.

FIG. 5 shows a schematic sectional view of a cooling device for an airbag module for reducing the internal gas pressure of an airbag, with a piston for delivering a coolant stored in a reservoir of the cooling device into the interior of the airbag, the piston being driven by means of a pyrotechnic device for generating movement for delivering the coolant.

FIG. 6 shows a schematic sectional view of a modification of the cooling device shown in FIG. 5, the coolant being subjected to a gas for delivering the coolant via a membrane.

FIG. 7 shows a schematic sectional view of a modification of the cooling device shown in FIG. 5, in which the piston is mounted in the reservoir for placing the coolant under pressure via a rotatable threaded rod, so that the piston may be reversibly moved to and fro between two positions.

FIG. 8 shows a schematic sectional view of a further embodiment of a cooling device for reducing the internal gas pressure of an airbag, in which the coolant itself is under pressure.

FIG. 9 shows a schematic sectional view of a modification of the cooling device shown in FIG. 8 in which the coolant is pressurized via a gas cushion provided in the reservoir.

FIG. 10 shows the pressure which prevails in the airbag as a function of the time t for various instants t1, t2 and t3 of the activation of the cooling device.

DETAILED DESCRIPTION

FIG. 1 shows a schematic sectional view of an airbag module 1, with a first subassembly 2, comprising an airbag 20 and a gas generator 24 as well as a housing 3 for receiving the airbag 20 and the gas generator 24. The airbag module 1 has a separate second subassembly 4 which comprises at least one cooling device 46 for cooling gases located in the airbag 20.

The airbag 20 comprises an airbag covering 21 which defines an interior 22 of the airbag 20. The airbag 20 may be inflated with gas for protecting a person, by gas provided by the gas generator 24 being introduced into the interior 22 of the airbag 20. For activating the gas generator 24 said gas generator uses an igniter 24a which may be activated via control electronics on the vehicle side. The airbag 20 and the gas generator 24 of the airbag module 1 are secured to the housing 3 (generator support).

The housing 3 comprises a cover through which the airbag 20 which is shown in FIG. 1 in an inflated state, may be deployed in a main deployment direction 70 into an outer chamber surrounding the airbag module 1.

The cover of the housing 3 is located opposite a base 3a of the housing 3 counter to the main deployment direction 70, which is connected in the main deployment direction 70 via a wall 3b projecting from the base 3a to the cover (not shown) of the housing 3. The base 3a comprises a central, continuous gas generator opening 3c with a peripheral edge region 3d bordering the gas generator opening 3c on which a flange 25 of the gas generator 24 bears, which encloses the gas generator 24 transversely to the main deployment direction 70 and serves for fastening the gas generator 24 to the edge region 3d of the gas generator opening 3c. The flange 25 is in this case configured to be planar and annular, so that it is designed for bearing flat against the edge region 3d of the gas generator opening 3c.

The airbag 20 has an inlet opening 27 through which gas may be introduced into the interior 22 of the airbag 20 for inflating the airbag 20. For securing the airbag 20 to an inner face of the base of the housing 3 facing the airbag 20, a peripheral edge region 28 of the inlet opening 27 of the airbag 20 and/or the airbag covering 21 is clamped in the main deployment direction 70 between the edge region 3d of the gas generator opening 3c and the flange 25 of the gas generator 24. As a result, the gas generator 24 projects in the main deployment direction 70 through the inlet opening 27 of the airbag 20 into the interior 22 of the airbag 20.

The airbag module 1 shown in FIG. 1, is an airbag module 1, the first subassembly 2 thereof being provided for assembling to a hub 50 of a steering wheel for a motor vehicle, which may be rotatably mounted on a motor vehicle about a steering axis 51 preferably coinciding with the main deployment direction 70. With a corresponding design of the individual components, the first subassembly 2 of the airbag module 1, however, may also be arranged at different points on the motor vehicle.

For fastening to the hub 50, the first subassembly 2 comprises a fastening means 23 in the form of two latching hooks, which project from the base 3a of the housing 3 counter to the main deployment direction 70 and are designed and provided for fastening the first subassembly 2 and/or the housing 3 to said hub 50 to engage behind recesses of the hub 50 with one respective end portion. In order to ensure a connection without clearance between the housing 3 (first subassembly 2) and the hub 50, the two latching hooks 23 respectively comprise a spring means 23a, the two spring means 23a spanning the housing 3 relative to the hub 50, so that the housing 3 is forced away from the hub 50. As a result, the end portions of the latching hooks 23 engaging behind the recesses of the hub 50 are pressed against the hub 50 in the main deployment direction 70 (steering axis 51).

The length of the latching hooks 23 is dimensioned in the main deployment direction 70 such that the base 3a of the housing 3 is arranged in the main deployment direction 70, in a state of the first subassembly 2 secured to the hub 50 according to requirements, at a distance from the hub 50, which—relative to said state—extends along the base 3a. Thus between the base 3a and the hub 50 a constructional space is available in which the second subassembly 4 comprising the cooling device 46 is arranged which is also secured to the hub 50 of the steering wheel.

The cooling device 46 comprises a reservoir 40 for storing a liquid coolant 41, which may be delivered via a nozzle 42 provided on the reservoir 40 through at least one discharge opening 44 of the nozzle 42 in a discharge direction 43 oriented parallel to the main deployment direction 70 into the interior 22 of the airbag 20.

The nozzle 42 and the at least one discharge opening 44 thereof are in this case designed such that the coolant 41, when it is delivered from the reservoir 40 through the discharge opening 44, is atomized, i.e. fractionated into small droplets. For forcing out the coolant 41 from the reservoir 40 of the cooling device 46, the cooling device 46 has a device for generating movement 45 which may be activated via control electronics on the vehicle side. The device for generating movement 45 is designed to provide after its activation an excess pressure in the reservoir 40, which forces the coolant 40 in the discharge direction 43 out of the reservoir 44. A closure 47 of the at least one discharge opening 44 is thus opened and/or removed (see FIGS. 5 to 9). The closure 47 of the discharge opening 44 may be configured integrally with the reservoir 40 of the cooling device 46 and tear open as a result of the excess pressure. In a similar manner a reversible openable and/or closable valve may be used as a closure 47 for the discharge opening 44, which may be activated independently of the device for generating movement 45, in order to open up the discharge opening 44. Moreover, the coolant 41 in the reservoir 40 may be enclosed by a membrane 47 which acts as a closure for the reservoir 40 and bursts open when the reservoir 40 is pressurized.

It is significant that the activation of the cooling device 46 may take place completely independently of the activation of the gas generator 24. In this case, depending on a specific accident situation, by means of a suitable electronic control unit, the time of the activation of the cooling device 46 may be calculated. With a reversible openable and/or closable closure 47 of the discharge opening 44, additionally it is conceivable that for metering the coolant 41 by means of the electronic control unit a timespan is calculated during which the coolant 41 is delivered through the discharge opening 44 of the nozzle. To this end, an excess pressure may be provided in the reservoir 40 which delivers the coolant 41 into the interior 22 of the airbag 20, by a device for generating movement 45 operating in a reversible manner, for example by a plunger driven by motor which presses against the liquid coolant 41 in the discharge direction 44.

As with a uniform volume and a uniform quantity of gas, the pressure of the gas located in the airbag 20 is directly proportional to the temperature of the gas, a reduction of the gas pressure prevailing in the airbag 20 is achieved by cooling. The cooling effect occurs as the coolant is atomized and vaporized by the hot gas located in the interior 22, the temperature of the gas being reduced, as for converting the liquid phase of the coolant 41 into the gaseous phase, energy has to be used. Thus by means of the controllable cooling of the gas located in the airbag 20, the airbag 20 may be adapted to a specific accident situation. Thus, for example a premature cooling of the gas (reduction of the gas pressure) may take place when a driver is at too short a distance from the airbag in the main deployment direction 70 of the airbag 20.

For introducing the coolant 41 delivered from the reservoir 40 into the interior 22 of the airbag 20, the cooling device 46 is arranged in the main deployment direction 70 between the base 3a and the hub 50 such that the at least one discharge opening 44 of the nozzle 42 in the discharge direction 43 coinciding with the main deployment direction 70 opposes a through-opening 30 configured on the base 3a of the housing 3, i.e. in particular is arranged at a distance from said through-opening 30 and/or from the base 3a in the discharge direction 43. Fastening of the cooling device 46 to the hub 50 takes place in particular by securing the reservoir 40 to the hub 50. In this case, the reservoir 40 may be arranged in a corresponding recess of the hub 50 and fixed there.

The through-opening 30 of the housing 3 communicates with and is aligned with a through-opening 29 of the edge region 28 of the airbag covering 21 arranged thereover in the main deployment direction 70, as well as a through-opening 26 of the flange 25 of the gas generator 24 located above the through-opening 29 of the edge region 28. At other points such through-openings of the housing 3, the airbag covering 21 and the flange 25 located above one another in a congruent manner are used for securing the flange 25 to the housing 3 by means of a screw, rivet or the like.

Coolant 41 delivered from the reservoir 40 may thus pass in the discharge direction 43 through the three through-openings 26, 29, 30 located above one another into the interior 22 of the airbag 20, in order to cool gas located therein for reducing the internal airbag pressure.

Expediently, during assembly of the airbag module 1 on the hub 50 initially the second subassembly 4, i.e. the cooling device 46, is secured via the reservoir 40 to the hub 50. Then the first subassembly 2 is secured by means of the fastening means 23 to the hub 50, the through-opening 30 of the housing 3 being positioned such that the nozzle 42 (discharge opening 44) opposes the through-opening 30 of the housing 3 in the discharge direction 43.

If required, by means of a sealing element 32 in the form of a sealing ring (O-ring) a connection is made between the housing 3 (first subassembly 2) and the cooling device 46 (second subassembly 4), so that delivered coolant 41 is not able to flow past the through-opening 30 of the housing 3. In this case, the sealing element 32 on the one hand is supported in the main deployment direction 70 on the base 3a of the housing 3 and on the other hand on the reservoir 40, encompassing the nozzle 42 transversely to the main deployment direction 70 in cross section.

In the event that no such sealing element 32 is present, the through-opening 30 of the housing 3 additionally serves as a discharge opening, through which gases located in the interior 22 of the airbag 20 may escape from the interior 22, in order to improve the energy absorption of the airbag 20.

Naturally, there is also the possibility of providing a plurality of cooling devices 46 in the manner described above, the possibility existing of merely sealing one part of the corresponding through-openings 30 of the housing 3 as described above by means of a sealing element 32.

FIG. 2 shows a modification of the embodiment shown in FIG. 1, in which in contrast to FIG. 2 the nozzle 42 is associated with the first subassembly 2, and is arranged in the through-opening 30 of the housing 3. In this case, the nozzle 42 penetrates the three through-openings 26, 29, 30 located above one another and bears with a top portion 42a on an inner face of the flange 25 facing the interior 22, a free end portion 42b of the nozzle 42 projecting from the through-opening 30 of the housing 3, so that it projects from the base 3a of the housing 3 counter to the main deployment direction 70.

This free end portion 42b of the nozzle 42 is configured for arranging in a recess 40a of the reservoir 40, so that a connection is made between the reservoir 40 and the nozzle 42 so as to convey coolant.

Said free end portion 42b is in this case (positively) inserted into a recess 40a of the reservoir 40 counter to the discharge direction 43. A sealing connection between the reservoir 40 and the base 3a of the housing 3 may in turn be achieved by means of a sealing element 32, which is arranged in the main deployment direction 70 (and/or discharge direction 43 or steering axis 51) between the reservoir 40 and the base 3a, encompassing the nozzle 42 in cross section.

The connection between the nozzle 42 and the reservoir 40 is in the present embodiment only produced during assembly of the airbag module 1 on the hub 50. To this end, initially the second subassembly 4, i.e. the cooling device 46 without the nozzle 42, is secured to the hub 50 and then the first subassembly 2 is secured with the nozzle 42 arranged in the through-opening 30 of the housing 3 via the fastening means 23 to the hub 50, the sealing element 32 sealingly bearing against the reservoir 40 and the base 3a.

The nozzle 42 is already secured in the through-opening 30 of the housing 3, so that the free end portion 42b of the nozzle 42, when securing the first subassembly 2 to the hub 50 according to requirements (the direction of assembly extends counter to the main deployment direction), is introduced via the fastening means 23 into the recess 40a of the reservoir 40. The length of the latching hooks forming the fastening means 23 in the main deployment direction 70 is dimensioned such that the base 3a of the housing 3—in a first subassembly 2 arranged relative to the hub 50 according to requirements—presses the sealing element 32 encompassing the nozzle 42 sealingly against the reservoir 40.

Moreover, for securing the gas generator 24 to the base 3a of the housing 3 fastening elements 90 are provided which in the same manner as the nozzle 42 penetrate through-openings 26, 29, 30 of the flange 25, the edge region 28 of the inlet opening 27 of the airbag 20 and the base 3a of the housing 3 located above one another in a congruent manner. The fastening elements 90 may in this case be screwed from an outer face of the base 3a remote from the airbag 20 by means of nuts, so that a stable connection is produced between the gas generator 24 and the housing 3. In this case, the flange 25 of the gas generator 24 is pressed counter to the main deployment direction 70 against the edge region 3d of the gas generator opening 3c, the edge region 28 of the inlet opening 27 of the airbag 20 being clamped fixedly between the flange 25 and the edge region 3d of the gas generator opening 3c. Alternatively, the fastening elements 90 may also be configured as rivets or secured in another manner to the outer face of the base 3a remote from the airbag 20.

FIG. 3 shows a modification of the embodiment shown in FIG. 2 in which in contrast to FIG. 2 the nozzle 42 is not directly connected to the reservoir 40, but via an additional line 33 in the form of a hose pipe. As a result, advantageously the position of the reservoir 40 on the hub 50 is not determined by the position of the nozzle 42 relative to the hub 50.

FIG. 4 shows a modification of the embodiment shown in FIG. 1 in which the first subassembly 2 of the airbag module 1 in contrast to FIG. 1 is fastened to a dashboard 60 of a motor vehicle, which extends along the vehicle transverse axis y. Such an airbag module 1 is suitable in particular for protecting a passenger. For fastening the first subassembly 2 to the dashboard 60 a retaining element 62 is provided on a side of the dashboard 60 remote from the passenger which may be configured integrally with the dashboard 60. The retaining element 62 forms a receiver 61 for the housing 3 of the airbag module 1 in which the housing 3 may be arranged such that the cover of the housing 3 terminates flush with the dashboard 60 and/or is arranged in the main deployment direction 70 of the airbag 20 in front of the dashboard 60. In this case, the cover may be formed by an openable region of the dashboard 60 and/or an outer coating of the dashboard 60.

The retaining element 62 has a wall 63 defining the receiver 61 of the retaining element 62 on which the second subassembly 4 comprising the cooling device 46 is arranged so that the reservoir 40 of the cooling device 46 is arranged transversely to the main deployment direction 70 of the airbag 20 adjacent to the housing 3 in front of the wall 3b of the housing 3 projecting from the base 3a of the housing 3.

In contrast to the airbag module 1 shown in FIG. 1, the through-opening 30 of the housing 3 is configured on the wall 3b of the housing 3, so that the discharge opening 44 of the nozzle 42 of the cooling device 46—relative to a state of the cooling device 46 (second subassembly 4) secured according to requirements to the retaining element 62—opposes said through-opening 30 in the discharge direction 44, the discharge direction 43 extending at an angle relative to the main deployment direction 70 along which the wall 3b of the housing 3 projects from the base 3a of the housing 3. In other words, the discharge direction 43 forms with the wall 3b of the housing 3 an acute angle.

So that coolant 41 delivered by the nozzle 42 is able to pass through the through-opening 30 of the wall 3b of the housing 3 into the interior 22 of the airbag 20, the airbag covering 21 of the airbag 20 has a through-opening 29 communicating with the through-opening 30 of the housing 3, which at least in a deployed state of the airbag 20 comes to rest on the through-opening 30 of the housing 3, so that the cooling device 46 may cause the coolant 41 to flow through the two communicating through-openings 29, 30 into the interior 22 of the airbag 20. Alternatively, the airbag 20 may be secured to the upper region of the wall 3b of the housing 3, so that coolant 41 only passes via a through-opening 30 in the housing 3 into the interior 22 of the airbag 20.

Moreover, in contrast to FIG. 1 the gas generator 24 of the first subassembly 2 shown in FIG. 4 is not secured via a peripheral flange to a gas generator opening of the housing 3, but preferably arranged entirely within the housing 3 and secured there. Preferably, said gas generator 24 is a tubular gas generator, the longitudinal axis thereof extending along the vehicle transverse axis y—relative to a state of the airbag module 1 arranged according to requirements on the dashboard 60.

FIG. 5 shows a schematic sectional view of a possible embodiment of the cooling device 46 shown in FIGS. 1 to 4, comprising a reservoir 40, in which a liquid coolant 41 is stored, which is introduced into the interior 22 of the airbag 20 for reducing the internal gas pressure of the airbag 20 when inflating the airbag 20. The reservoir 40 of the cooling device 46 comprises a cylindrical wall 40b, the longitudinal axis 40c thereof extending in the main deployment direction 70 and/or steering axis 51 (see FIGS. 1, 3 and 4) or at an angle to these directions (see FIG. 2).

For atomizing the coolant 41, a nozzle 42 is provided on the reservoir 40 comprising at least one channel-like discharge opening 44, which allows a delivery of the coolant 41 in a solid angle in the discharge direction 43 aligned with the longitudinal axis 40$c$ of the reservoir. The nozzle 42 may also comprise a plurality of such discharge openings 44. In particular, the discharge openings 44 may be at an angle relative to the longitudinal axis 40$c$ of the reservoir 40, in order to increase the aforementioned solid angle. Preferably, the nozzle 42 is inserted counter to the discharge opening 43 (longitudinal axis 40$c$)—as already described above—into a recess 40$a$ defined by the cylindrical wall 40$b$ on a front face of the reservoir 40 and secured there in a suitable manner.

In a portion of the reservoir 40 opposing the nozzle 42 along the longitudinal axis 40$c$ of the reservoir 40 a piston 40$d$ is displaceably mounted in the reservoir 40 along the longitudinal axis 40$c$ of the reservoir 40, so that the piston 40$d$ when displaced in the direction of the nozzle 42 forces the coolant 41 stored in the reservoir 40 through the discharge opening 44 into the interior 22 of the airbag 20, the discharge opening 44 of the reservoir 40 being dimensioned such that the coolant 41 when leaving the reservoir 40 is atomized into fine droplets. For sealing the reservoir 40 the piston 40$d$ bears with a peripheral outer edge region preferably sealingly against the wall 40$b$ of the reservoir 40.

For displacing the piston 40$d$ from its initial first position into its second position located closer to the nozzle 42, a device for generating movement 45 is used, which is configured to subject the piston 40$d$ on its side remote from the nozzle 42 to a pyrotechnically generated gas.

Before the delivery of the coolant 41, the discharge opening 44 may be closed by means of a closure in the form of a film 47. Such a film may be provided inside or outside the reservoir 40 and/or the nozzle 42.

The time for subjecting the piston 40$d$ to a gas (relative to the starting time for the deployment of the airbag) in this case is calculated by an electronic control unit 80 coupled to the device for generating movement 45 and namely depending on the aforementioned passenger-relevant and/or vehicle-relevant parameters. The calculation of the time takes place in real time. For detecting the aforementioned parameters, preferably at least one sensor unit 81 is used, which may also be a pre-crash detector (i.e. a detector which is designed and provided for detecting an imminent collision which has not yet occurred).

FIG. 6 shows a schematic sectional view of a modification of the cooling device 5 shown in FIG. 5, in contrast to FIG. 5 no piston 40$d$ being provided, but the coolant 41 being enclosed before the triggering of the device for generating movement 45 in a destructible covering in the form of a membrane 47. When subjected to the gas provided by the device for generating movement 45, said membrane 47 bursts and the coolant 41 is forced out of the reservoir 40 by the gas pressure produced by the device for generating movement 45 in the reservoir 40.

FIG. 7 shows a schematic sectional view of a modification of the cooling device 45 shown in FIGS. 5 and 6, in which the piston 40$d$ is mounted in the reservoir 40 to be movable to and fro continually between a first and a second position, via a threaded rod 40$e$ which may be driven in a motorized manner.

The threaded rod 40$e$ comprises a thread and projects from a side of the piston 40$d$ remote from the nozzle counter to the main deployment direction 70, i.e. along the longitudinal axis 40$c$ of the reservoir 40, and is screwed into a central recess 40$f$ of a base 40$g$ of the reservoir 40 provided with a thread, so that, by rotating about its longitudinal axis 40$c$ which coincides with the longitudinal axis 40$c$ of the reservoir 40, it is displaced away therefrom in the direction of the discharge opening 44. Accordingly, the piston 40$d$ connected to the threaded rod 40$e$ in the reservoir 40 is moved to and fro along the longitudinal axis 40$c$ of the reservoir 40 and/or the threaded rod 40$e$. The threaded rod 40$e$ is preferably coupled to a device for generating movement 45 in the form of a motor, which is designed to rotate the threaded rod 40$e$ about its longitudinal axis 40$c$ in order to displace the piston 40$d$ for the defined delivery of the coolant 41.

The device for generating movement 45 is, according to FIGS. 5 and 6, coupled to an electronic control unit 80, which is configured to control the device for generating movement 45, and namely depending on at least one parameter, which may be detected by means of a sensor unit 81 which is coupled to the control unit 80. In this case, the sensor unit 81 repeatedly detects the at least one parameter during a collision, preferably at regular intervals, so that the pressure acting on the coolant 41 for the defined delivery of the coolant 41 may be controlled in real time by the electronic control unit 80 cooperating with the device for generating movement 45.

FIG. 8 shows a schematic sectional view of a further embodiment of a cooling device 46 in which, in contrast to FIGS. 5 to 7, the coolant 41 itself is pressurized. For delivering the coolant 41 a closure 47 which may be opened by means of a device for generating movement 45 is opened, the closure 47 preferably being able to be opened continually, i.e. by means of the closure 47 the outlet cross section of the discharge opening 44 of the nozzle 42 of the reservoir 40 may be altered.

For controlling the outlet cross section of the discharge opening 44, depending on at least one of the aforementioned relevant passenger-relevant and vehicle-relevant parameters, the device for generating movement 45 (operating reversibly) is again coupled to an electronic control unit 80 which, depending on the at least one parameter, which is detected by the sensor unit 81 coupled to the control unit 80, calculates at which time and over which period of time the closure 47 is opened and correspondingly controls the device for generating movement 45.

FIG. 9 shows a schematic sectional view of a modification of the cooling device 46 shown in FIG. 8, in contrast to FIG. 8 the coolant 41 itself not being pressurized but being acted upon by a gas cushion 40$h$ provided in the reservoir 40, which acts on the coolant 41 via a piston 40$d$.

FIG. 10 shows, by way of example, the pressure p which prevails in the airbag 20 for the case of an occupant who dips into the airbag as a function of the time t for various instants of the activation of the cooling device t1, t2 and t3 (dashed curves). The continuous curve represents the pressure p which prevails in the airbag 20 when the cooling device 46 is not activated (reference curve). Subsequently, the pressure p in the airbag 20 rises first of all sharply as far as a maximum value pmax after the gas generator 24 is activated, and then drops again in accordance with the natural cooling of the gas and as a consequence of the gas which escapes from the airbag 20, that drop in the pressure happening less sharply than the initial rise to the maximum pmax after the activation of the gas generator 24.

The coolant 41 for cooling the gas which is situated in the airbag 20 can be introduced into the airbag 20 at any desired instants during or after the inflation of the airbag 20. This is shown in FIG. 10 using three pressure profiles which are shown by way of example for the activation instants $t1<t2<t3$ of the cooling device 46. In the present case, the instant of the activation of the cooling device 46 is to be understood as that instant t, at which the cooling device 46 is just beginning to release the coolant 41.

At the activation instant t1 of the cooling device 46, the inflation operation has not yet been terminated and the airbag 20 has not yet unfurled completely as a consequence. As a result of the incipient cooling, the pressure pmax is not reached, but rather the pressure p drops immediately and quickly to a first plateau E1, the rate of the pressure drop to that plateau E1 corresponding (in absolute terms) approximately to the initial pressure increase. In contrast, the drop in the pressure p starting from the maximum value pmax without additional cooling by the cooling device 46 takes place substantially more slowly according to the reference curve.

At the activation instant t2 of the cooling device 46, the inflation operation of the airbag 20 is almost terminated (the gas generator 24 is still emitting small quantities of gas), with the result that, when cooling begins at the instant t2, the maximum value of the pressure pmax is almost reached and the airbag 20 has already unfurled completely. It is also the case here that the pressure p falls quickly to a first plateau E2 after cooling begins at the instant t2, the rate of the pressure drop once again corresponding approximately (in absolute terms) to the rate of the initial pressure increase and being greater than the corresponding rate of the reference curve.

At the activation instant t3, the gas emission of the gas generator 24 is terminated and the airbag 20 is inflated fully, with the result that the pressure p which prevails in the airbag 20 has already fallen somewhat below the maximum value pmax. When cooling begins at the instant t3 (shortly after the maximum pressure pmax is reached), the pressure p once again drops quickly to a first plateau E3, the rate of the pressure drop as previously corresponding approximately (in absolute terms) to the rate of the initial pressure increase to the maximum pmax and being greater than the corresponding rate of the reference curve.

Proceeding from said first plateaus E1, E2 and E3, the pressure p drops to zero approximately according to the reference curve.

The transition of the individual dashed pressure curves of FIG. 10 to the first plateaus E1 to E3 is a result of the end of the introduction of coolant at the instants t1*, t2* and t3*. At these instants, the cooling capacity of the coolant 41 is used up as it were and the pressure p moves into the approximately linear region of the first plateaus E1 to E3. Of course, the coolant 41 can also be added in a quantity which causes the pressure p to drop to zero immediately, without said plateaus E1 to E3.

The priority application, German Application DE 10 2007 037 604.0, filed Aug. 7, 2007, including the specification, drawings, claims and abstract, is incorporated herein by reference in its entirety.

What is claimed is:

1. An airbag module for a motor vehicle, comprising
a first subassembly which is configured to be arranged on a motor vehicle,
an airbag of the first subassembly which is inflated for protecting a person, which comprises an interior which is filled with gas for inflating the airbag,
a housing of the first subassembly, for receiving the airbag,
a gas generator of the first subassembly for inflating the airbag with gas,
an additional second subassembly, and
a reservoir of the second subassembly for storing a coolant which is designed and provided for cooling gases located in the interior of the airbag,
wherein the additional second subassembly is separate from the first subassembly and is designed and provided to be arranged at a distance from the first subassembly.

2. The airbag module of claim 1, further comprising a nozzle provided on the reservoir for delivering the coolant into the interior of the airbag.

3. The airbag module of claim 1, wherein the housing comprises a through-opening communicating with the interior of the airbag.

4. The airbag module of claim 2, wherein the nozzle is configured to deliver the coolant in a discharge direction through at least one discharge opening of the nozzle into the interior of the airbag.

5. The airbag module of claim 2, wherein the nozzle is associated with the second subassembly.

6. The airbag module of claim 2, wherein the nozzle is associated with the first subassembly.

7. The airbag module of claim 2, wherein the reservoir is connected to the nozzle so as to convey coolant by means of a line, in particular in the form of a hose pipe.

8. The airbag module of claim 1, wherein the first subassembly for fastening to a steering wheel of a motor vehicle has at least one fastening means via which the first subassembly may be secured to a part of the steering wheel.

9. The airbag module of claim 1, wherein the first subassembly is designed and provided for arranging on a dashboard of a motor vehicle.

10. The airbag module of claim 1, further comprising a device for generating movement associated with the second subassembly, which is configured to subject the coolant to a pressure for delivering the coolant.

11. The airbag module of claim 10, wherein the device for generating movement is configured on the reservoir.

12. The airbag module of claim 10, wherein the device for generating movement is configured to deliver gas, in particular to generate gas pyrotechnically, for subjecting the reservoir to pressure.

13. The airbag module of claim 10, wherein the device for generating movement cooperates with an electronic control unit, which triggers the device for generating movement at a predeterminable time for subjecting the reservoir to a pressure depending on at least one parameter which may be detected by a sensor unit.

14. The airbag module of claim 13, wherein the electronic control unit is configured to calculate the time, depending on at least one parameter which may be detected by the sensor unit.

15. The airbag module of claim 1, wherein the nozzle is set up and provided for atomizing the coolant during the release of the coolant.

* * * * *